(12) United States Patent
Read

(10) Patent No.: US 9,442,017 B2
(45) Date of Patent: Sep. 13, 2016

(54) OCCUPANCY SENSOR

(71) Applicant: Dale Read, Stanford-le-hope (GB)

(72) Inventor: Dale Read, Stanford-le-hope (GB)

(*) Notice: Subject to any disclaimer, the term of this patent is extended or adjusted under 35 U.S.C. 154(b) by 110 days.

(21) Appl. No.: 14/149,017

(22) Filed: Jan. 7, 2014

(65) Prior Publication Data
US 2015/0192471 A1 Jul. 9, 2015

(51) Int. Cl.
| | | |
|---|---|---|
| *G01J 5/00* | (2006.01) | |
| *G01J 5/02* | (2006.01) | |
| *G01J 5/04* | (2006.01) | |
| *G01J 5/20* | (2006.01) | |
| *G01J 5/06* | (2006.01) | |
| G08B 13/19 | (2006.01) | |
| G08B 21/22 | (2006.01) | |

(52) U.S. Cl.
CPC .............. *G01J 5/0025* (2013.01); *G01J 5/025* (2013.01); *G01J 5/028* (2013.01); *G01J 5/041* (2013.01); *G01J 5/06* (2013.01); *G01J 5/20* (2013.01); *G01J 5/00* (2013.01); *G01J 5/02* (2013.01); *G01J 2005/068* (2013.01); *G08B 13/19* (2013.01); *G08B 21/22* (2013.01)

(58) Field of Classification Search
CPC ............ G01J 5/00; G01J 5/02; G08B 13/19; G08B 21/22
See application file for complete search history.

(56) References Cited

U.S. PATENT DOCUMENTS

| | | | | |
|---|---|---|---|---|
| 5,772,326 | A * | 6/1998 | Batko et al. .................. | 374/142 |
| 6,188,318 | B1 * | 2/2001 | Katz et al. ................. | 340/545.3 |
| 6,587,049 | B1 | 7/2003 | Thacker | |
| 6,800,854 | B2 * | 10/2004 | Pfister .................... | G08B 13/19 |
| | | | | 250/338.1 |
| 9,329,087 | B2 * | 5/2016 | Saito ........................ | G01J 5/04 |
| 2010/0052574 | A1 | 3/2010 | Blakeley | |
| 2014/0239817 | A1 * | 8/2014 | Leinen ................... | H05B 37/02 |
| | | | | 315/152 |
| 2014/0241581 | A1 * | 8/2014 | Narayanan et al. .......... | 382/103 |
| 2014/0313032 | A1 * | 10/2014 | Sager et al. ............. | 340/539.17 |
| 2015/0120360 | A1 * | 4/2015 | Adriaenssens et al. ..... | 705/7.16 |
| 2016/0003493 | A1 * | 1/2016 | Katz .................... | F24F 11/0034 |
| | | | | 700/275 |

FOREIGN PATENT DOCUMENTS

| | | |
|---|---|---|
| EP | 0 838 792 A2 | 4/1998 |
| EP | 1482464 A1 | 1/2004 |
| WO | 98 34206 A1 | 8/1998 |
| WO | WO 2014060903 A1 * | 4/2014 |

* cited by examiner

*Primary Examiner* — Christine Sung
(74) *Attorney, Agent, or Firm* — Andrew W. Chu; Craft Chu PLLC

(57) ABSTRACT

An occupancy sensor includes a passive infrared sensor (PIR sensor) and an infrared sensor (IR sensor). The occupancy sensor is configured to confirm occupancy or non-occupancy in dependence on signals measured by both the PIR sensor and the IR sensor.

17 Claims, 2 Drawing Sheets

OCCUPANCY SENSOR

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present disclosure relates to an occupancy sensor. Preferably, it further relates to an automated occupancy monitoring system comprising one or more occupancy sensors and at least one data gathering unit.

2. Description of Related Art Including Information Disclosed Under 37 CFR 1.97 and 37 CFR 1.98

Office space is increasingly expensive both in terms of property costs (rent, etc.) and utility costs (electricity, etc.). With the advent of mobile computing and telecommunications solutions workers spend an increasing amount of time away from their desks and furthermore are not limited to the use of a specific desk. Companies are increasingly looking at ways of optimizing the use of office space by employees to limit the overall required office space and the costs associated therewith. The starting point of any space optimization is the gathering of data by monitoring the workplace. Traditionally, such monitoring has been conducted manually by individuals. Such methods are, however, laborious, costly and inaccurate.

Whilst there are various technologies available that are provided to sense people movement, no suitable low cost sensor has been provided that is suitable for use as part of an automated occupancy monitoring system.

SUMMARY OF THE INVENTION

The present invention arose in a bid to provide an improved apparatus for automatically and accurately sensing occupancy.

According to the present invention, in a first aspect, there is provided an occupancy sensor comprising a passive infrared sensor (PIR sensor) and an infrared sensor (IR sensor), the occupancy sensor being configured to confirm occupancy or non-occupancy in dependence on signals measured by both the PIR sensor and the IR sensor.

The occupancy sensor may further comprise an ambient temperature sensor. The value sensed by the ambient temperature sensor may be subtracted from the value sensed by the IR sensor. The provision of an ambient temperature sensor allows for compensation of changes in ambient temperature to ensure accurate detection of warm bodies.

According to the present invention in a further aspect, there is provided an occupancy sensor as described above in combination with a desk, the occupancy sensor is arranged under the surface of the desk with the PIR and IR sensors facing in the direction of a user sitting at the desk.

The IR sensor is preferably configured such that its field of view is below the desk surface out beyond the rear edge of the desk surface by a predetermined distance. The predetermined distance may be up to 800 mm.

According to the present invention in another aspect, there is provided an automated occupancy monitoring system comprising one or more occupancy sensors as detailed above and at least one data gathering unit, the data gathering unit and the occupancy sensor being arranged to be in wireless communication with one another.

DETAILED DESCRIPTION OF THE DRAWINGS

According to a first arrangement, there is provided an occupancy sensor 1 comprising a passive infrared sensor (PIR sensor), an infrared sensor (IR sensor), and an ambient temperature sensor. The occupancy sensor is configured to confirm occupancy (or lack of occupancy) in dependence on signals measured by all of the sensors, preferably in dependence on signals measured by all of the sensors simultaneously.

Figure 1:
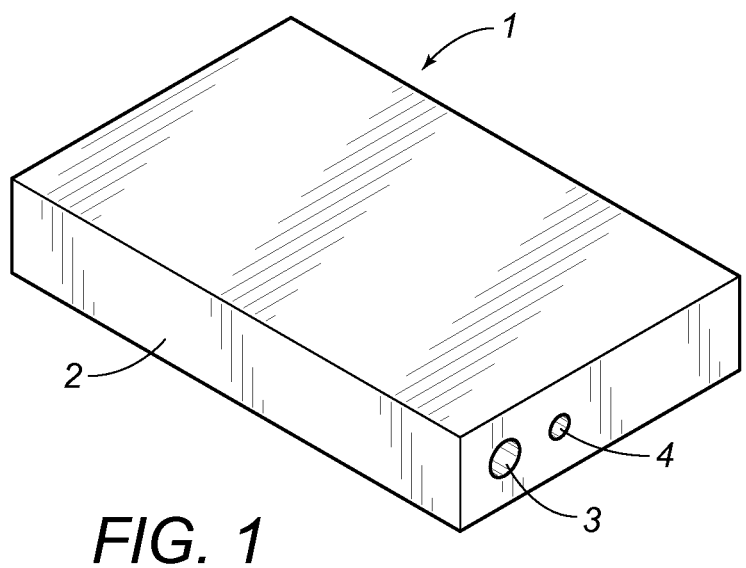
FIG. 1 shows a schematic view of an exemplary occupancy sensor according to the present invention.

The sensors that combine to form the occupancy sensor are housed in a self contained housing that is suitable for mounting in any area in which it is desired to monitor occupancy. The housing may comprise a substantially box-like housing 2 as shown in FIG. 1. The housing is preferably 80 mm×80 mm×20 mm or smaller. The housing is preferably provided with suitable attachment means (not shown) for attaching it to any desired structure or surface. The attachment means may comprise screw holes, adhesive pads, etc.

The housing includes the necessary circuitry for any sensors that are present, a power source, a microprocessor and communications circuitry, which comprises a radio, for providing a wireless link with a data gathering unit. The power source preferably comprises one or more batteries.

The PIR sensor and the IR sensor face in the same direction as one another. Suitable openings 3, 4 may be provided in the housing for the PIR sensor and the IR sensor and ambient temperature sensor.

One half of the PIR sensor is preferably shielded to enhance the swing of the PIR sensor and the detection of an approaching person. The shielding may be effected by covering half of the PIR sensor in black tape or black paint, or using any other means as will be readily appreciated by those skilled in the art.

The IR sensor and ambient temperature sensor may be combined in a single package. An exemplary suitable combined sensor package is model no. ZTP-135SR available from GE. An exemplary suitable PIR sensor is IRS-B210ST01 available from muRata. It will be readily appreciated by those skilled in the art that various alternative IR, ambient temperature and PIR sensors may be used.

The PIR sensor detects movement only. It does not detect presence. The IR sensor measures temperature but does not detect people. It is the unique combination of sensors in the occupancy sensor which, with the correct processing, detects occupancy.

High positive values sensed by the PIR sensor indicate a person approaching the occupancy sensor (indicating an OCCUPIED state) whilst high negative values indicate a person moving away from the occupancy sensor (indicating an UNOCCUPIED state).

The IR sensor is arranged to sense the presence (or absence) of warm bodies. When there is no warm body occupying the area covered by the IR sensor, the IR sensor will only sense (i.e. will only "see") the ambient conditions (indicating an UNOCCUPIED state). When there is a warm body occupying the area covered by the IR sensor, the IR levels sensed by the IR sensor will be above those sensed under ambient conditions (i.e. the IR sensor will "see" the warm body—indicating an OCCUPIED state). In some arrangements, the IR sensor may be mounted is such a way that its field of view is out to a range of 300 mm to 800 mm, however, this may be tailored to suit the situation and the area to be monitored.

The ambient temperature sensor preferably comprises a thermistor. The ambient temperature sensor is configured to monitor ambient temperature. By monitoring the ambient temperature using a thermistor, and converting this into a value that is subtracted from the IR value sensed by the IR sensor, inaccuracies in the IR value arising from a change in the temperature in the electronics through the day or in the air temperature, or otherwise, may be neutralized and the overall accuracy of the occupancy sensor may be increased.

The PIR sensor and the IR sensor are each used, independently, to provide an indication of an OCCUPIED or UNOCCUPIED state and not a confirmation of the state. Confirmation of an OCCUPIED or UNOCCUPIED state is achieved only when the values sensed by the PIR sensor and the values sensed by the IR sensor are considered in combination with one another.

Under the control of software, an automated occupancy monitoring system, which incorporates the occupancy sensor, may be configured to "learn" changing conditions sensed by the IR sensor (and the PIR sensor) to confirm an OCCUPIED or UNOCCUPIED state.

IR values at or below ambient indicate the absence of a warm body. These taken in combination with a negative PIR value will confirm an UNOCCUPIED state.

Conversely, IR values above ambient indicate the presence of a warm body. These taken in combination with a positive PIR value will confirm an OCCUPIED state.

Figure 3:
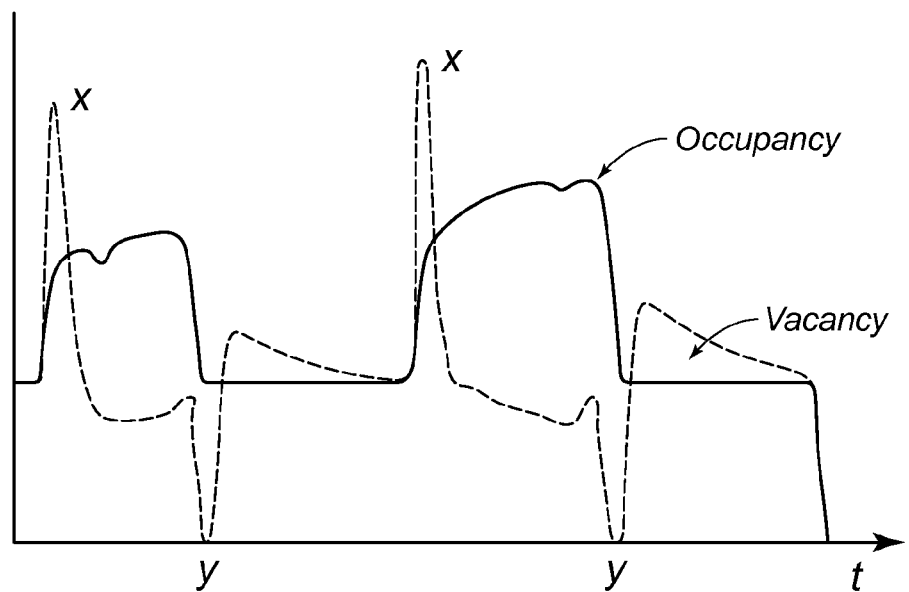
FIG. 3 shows a graph illustration of an exemplary plot of occupancy data received from the occupancy sensor of FIG. 1.

FIG. 3 shows an example plot from an occupancy sensor, the dashed line represents a trace from a PIR sensor and the solid line represents a trace from an IR sensor against time. The points X are representative of an IN EVENT (person approaching) and the points Y are representative of an OUT EVENT (person moving away). The OCCUPIED state and UNOCCUPIED state determined by considering both traces together are shown by the labels OCCUPANCY and VACANCY respectively.

The microprocessor within the occupancy sensor is arranged to run the software and to thereby control the occupancy sensor. It processes the data received from the IR and PIR sensors to generate an OCCUPIED or UNOCCUPIED signal for transmission using the communication circuitry.

The occupancy sensor is an ultra-low power device. The microprocessor is configured such that the occupancy sensor is normally switched off. Under control of the microprocessor, the occupancy sensor will switch on ("wake") intermittently and for a predetermined period of time that is shorter than the intermittent period during which it is switched off. The occupancy sensor may, for example switch on and remain on for up to 5 milliseconds per second, preferably for 2 to 3 milliseconds per second.

When switched on, the occupancy sensor will process the signals from the IR sensor and PIR sensor. The occupancy sensor runs analysis software that is capable of receiving the data sensed by each of the sensors, combining the sensed values of the PIR sensor, the IR sensor and the ambient temperature sensor and providing an OCCUPIED and UNOCCUPIED signal for transmission.

The software is preferably further configured to monitor the operational and battery statuses of the occupancy sensor and to control the radio frequency (RF) functionality of the sensor. Under the control of the software, the occupancy sensor will preferably transmit a signal to a data gathering unit only when a change of state occurs (i.e. only when the detected state changes from OCCUPIED to UNOCCUPIED or vice versa).

The steps of switching the occupancy sensor on and off and only transmitting a wireless signal when there is a change of state each assist in significantly extending the battery life of the occupancy sensor.

Any number of the occupancy sensors may be provided which are operatively linked to one or more data gathering units that are provided to receive and process data received from the occupancy sensors, and which together with the occupancy sensors form an automated occupancy monitoring system.

The occupancy sensors are each preferably linked to one of the data gathering units by the communications circuitry through a low power wireless network (iLan). Most preferably, each occupancy sensor is provided with a low power microprocessor unit that provides communication at a frequency of 315, 433, 868 or 915 MHz.

In order to provide a low cost solution, it is preferred that each of the occupancy sensors has its own unique PIR, IR and thermistor outputs. This is as opposed to the sensors of all of the occupancy sensors being configured to have set reference or trigger values. The software, by considering the outputs of all of the sensors of each of the occupancy sensors in combination will accurately determine an OCCUPIED or UNOCCUPIED state for each occupancy sensor in a controlled situation and without the requirement for pre-configuration of the sensors. In light of the control implemented there is no requirement for pre-calibration of the individual occupancy sensors, which again helps to reduce the cost of implementation.

Figure 2:
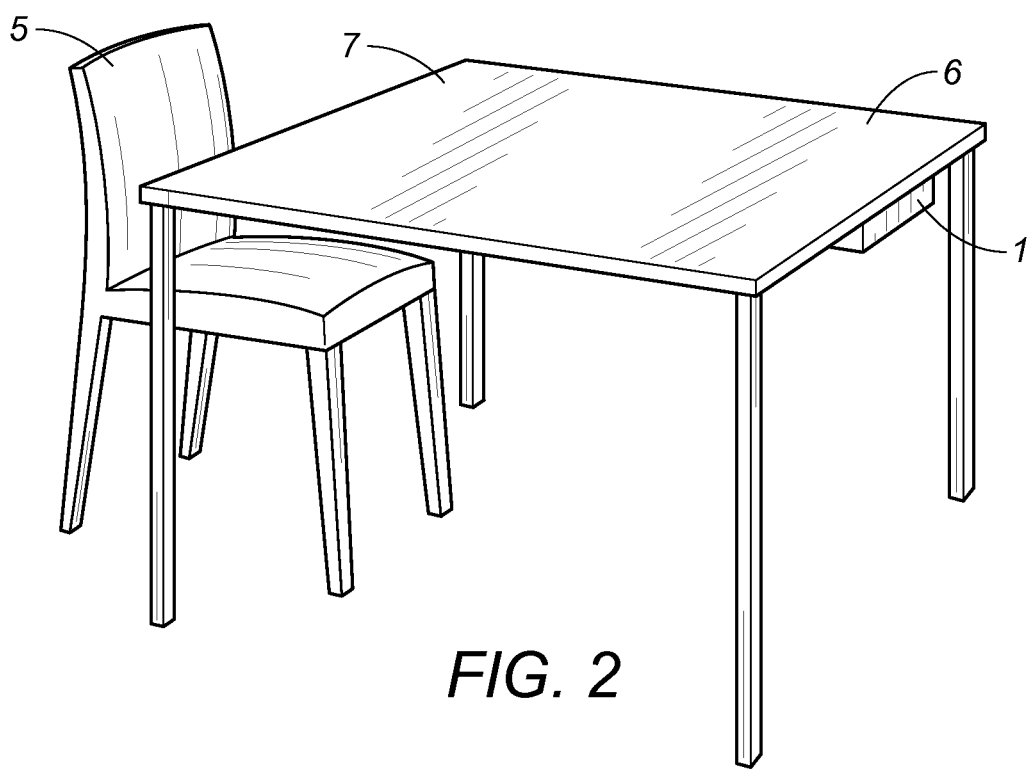
FIG. 2 shows a schematic view of the occupancy sensor of FIG. 1 mounted to a desk for monitoring occupancy of the desk.

One particular, non-limiting, use of the occupancy sensor of the present invention is to detect occupancy at desks. In this arrangement, a plurality of occupancy sensors may be provided with a sensor arranged under the desk surface of each desk that is to be monitored. A monitored desk is shown in FIG. 2. Each of the occupancy sensors is arranged to face back towards the chair 5 (i.e. each occupancy sensor is oriented such that the PIR and IR sensors face back towards the chair). The IR sensor here is preferably mounted in such a way that its field of view is below the desk surface out beyond the rear edge 7 of the desk surface 6 to sense a person sitting behind the desk. The field of view may extend out beyond the rear edge of the desk surface by a distance of up to 800 mm, most preferably in a range of 500 mm to 800 mm.

Figure 4:
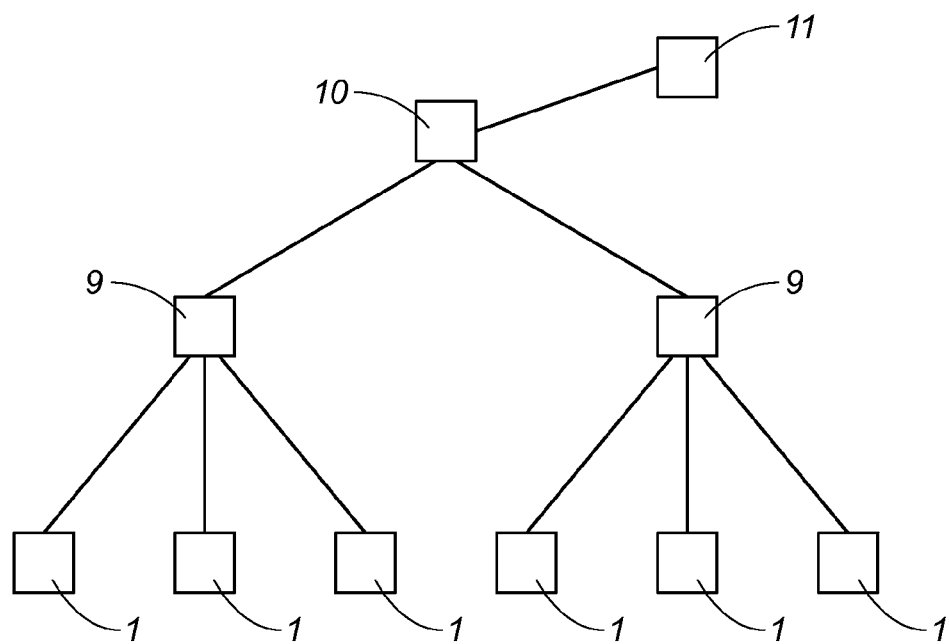
FIG. 4 shows a schematic view of an exemplary configuration of an automated occupancy monitoring system using plural occupancy sensors of FIG. 1.

With reference to FIG. 4, the data gathering units in the above described embodiment and/or in alternative embodiments may comprise one or more servers 11. These servers may comprise PCs as will be readily appreciated by those skilled in the art. The signals from the occupancy sensors 1 are received wirelessly by one or more data harvesters 10 and passed to a respective server 11 through a wired or wireless data link, such as a TCP/IP XML link. The data harvester(s) may receive wireless signals from the occupancy sensors directly or via data gatherers 9. In arrangements where the data harvesters receive signals directly from the occupancy sensors, the data gatherers will be omitted. Data gatherers 9 may be used to boost the range of the wireless signals from the occupancy sensors, which are preferably low powered devices to provide lengthy operation from their batteries. Such data gatherers may, for example, comprise wall mounted units that receive wireless signals from multiple local desk mounted occupancy sensors.

Note that the lines joining the elements of FIG. 4 represent data links, which are all preferably wireless and may conform to any suitable known protocols as will be readily appreciated by those skilled in the art. Whilst six occupancy sensors are shown connected to two data gatherers, more or less occupancy sensors may be provided and more or less occupancy sensors may be connected to each data gatherer, where provided. The arrangement of FIG. 4 is exemplary only and should not be considered limiting in any way. Numerous other configurations will be readily appreciated by those skilled in the art.

I claim:

1. An occupancy sensor, comprising:
   a passive infrared sensor measuring passive infrared signals;
   a shielding covering half of said passive infrared sensor; and
   an infrared sensor measuring infrared signals,
   wherein occupancy status is determined by said passive infrared signals and said infrared signals measured simultaneously.

2. The occupancy sensor as claimed in claim 1, further comprising: an ambient temperature sensor measuring temperature signals.

3. The occupancy sensor as claimed in claim 2, wherein said infrared signals are adjusted according to said temperature signals.

4. The occupancy sensor as claimed in claim 2, wherein the ambient temperature sensor comprises a thermistor.

5. The occupancy sensor as claimed in claim 1, wherein said passive infrared signals and said infrared signals confirm occupancy status.

6. The occupancy sensor as claimed in claim 1, further comprising: a power source.

7. The occupancy sensor as claimed in claim 1, further comprising: wireless communication means transmitting occupancy status to a remote device.

8. The occupancy sensor as claimed in claim 7, wherein said wireless communication means transmits occupancy when said occupancy status changes.

9. The occupancy sensor as claimed in claim 1, further comprising: a microprocessor, having a software package and controlling said passive infrared sensor and said infrared sensor.

10. The occupancy sensor as claimed in claim 9, wherein said microprocessor receives said passive infrared signals and said infrared signal so as to determine said occupancy status.

11. The occupancy sensor as claimed in claim 1, being a sleep state with said passive infrared sensor and said infrared sensor in a deactivated mode and a monitoring state with said passive infrared sensor and said infrared sensor in an activated mode intermittently for a predetermined period of time, said activated mode being shorter than said deactivated mode.

12. The occupancy sensor as claimed in claim 11, wherein said predetermined period of time is 2-3 milliseconds per second.

13. The occupancy sensor as claimed in claim 1, wherein the infrared sensor and passive infrared sensor face in a same direction.

14. The occupancy sensor as claimed in claim 1, further comprising: a housing, said passive infrared sensor and said infrared sensor being placed in said housing.

15. The occupancy sensor as claimed in claim 1, further comprising: a desk having a surface, said passive infrared sensor and said infrared sensor being arranged under said surface and facing in a direction of seating at said desk.

16. The occupancy sensor as claimed in claim 15, wherein said infrared sensor has a field of view below said surface and beyond a rear edge of said surface by a predetermined distance.

17. An automated occupancy monitoring system, comprising:
    one or more occupancy sensors as claimed in claim 1; and
    at least one data gathering unit, the data gathering unit and an occupancy sensor being arranged to be in wireless communication.

* * * * *